W. S. GRAHAM.
GANG PLOW.
APPLICATION FILED JAN. 22, 1915.
1,237,505.
Patented Aug. 21, 1917.
3 SHEETS—SHEET 2.
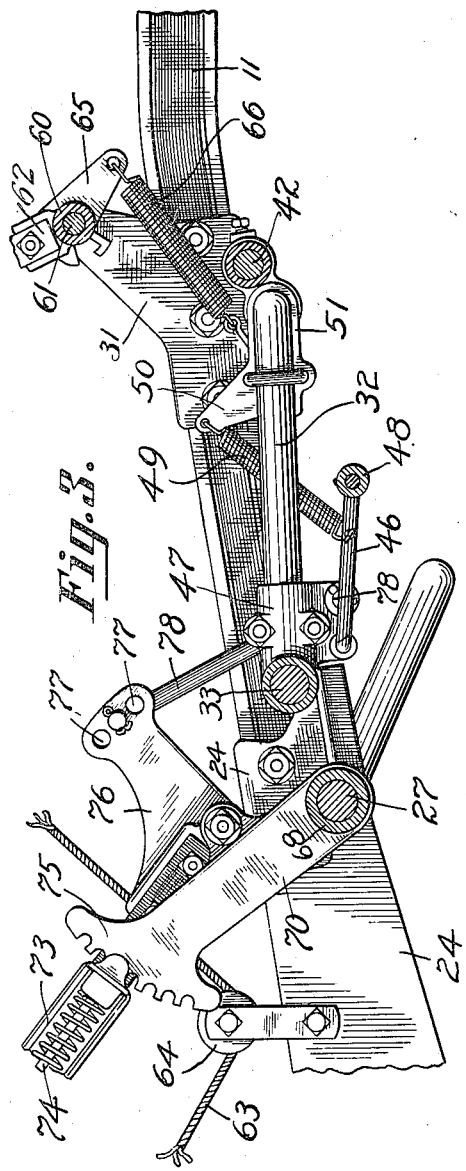
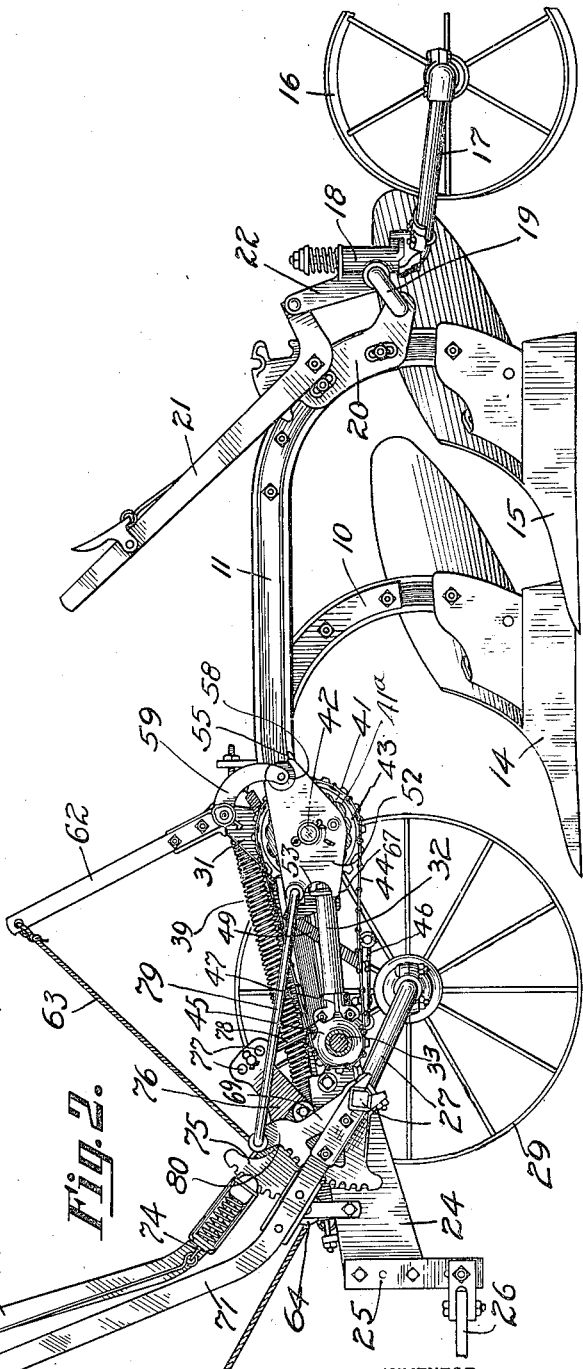
WITNESSES:
W. H. DeBusk
W. A. Furnner.
INVENTOR
William S. Graham
By Adams & Jackson
ATTORNEYS

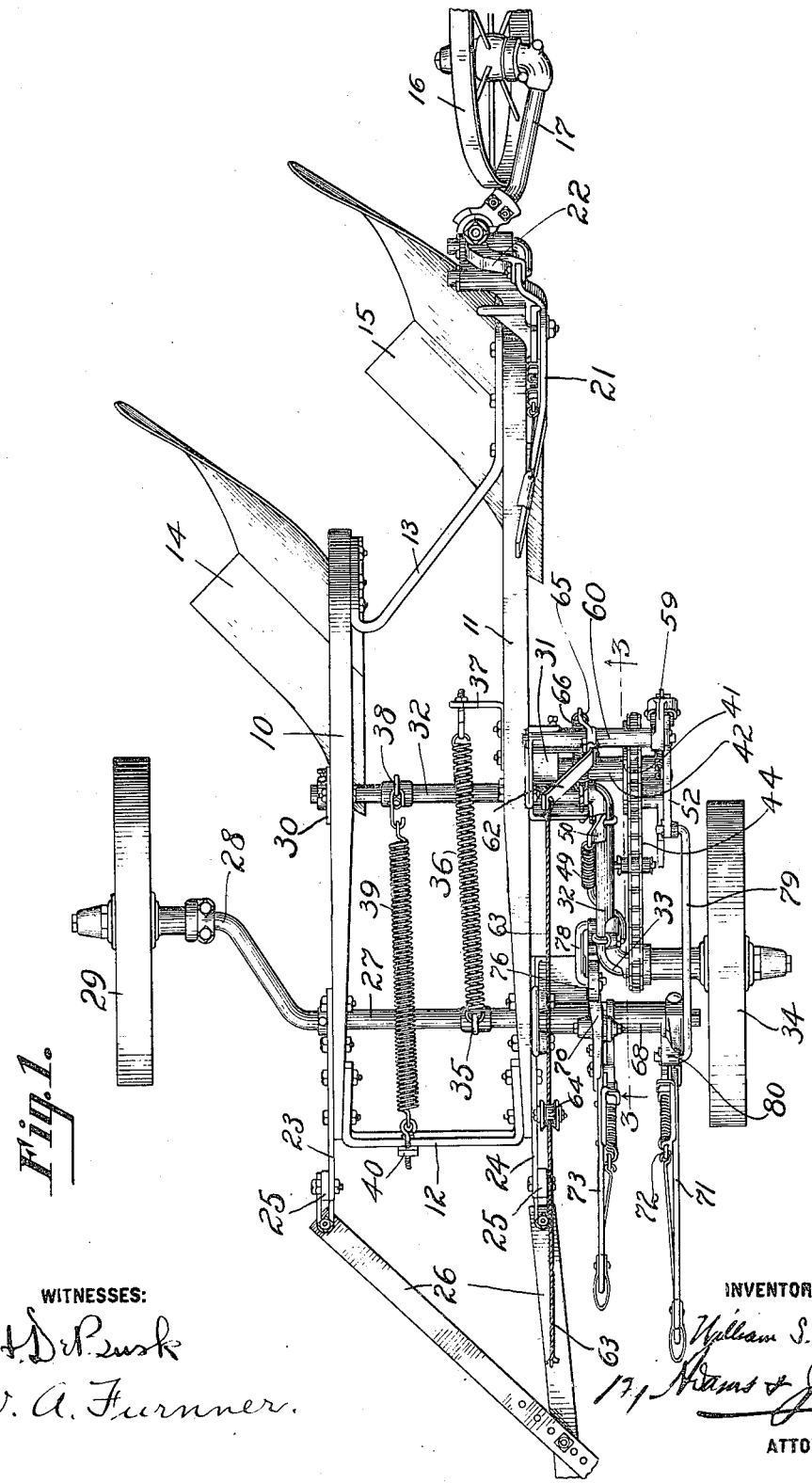

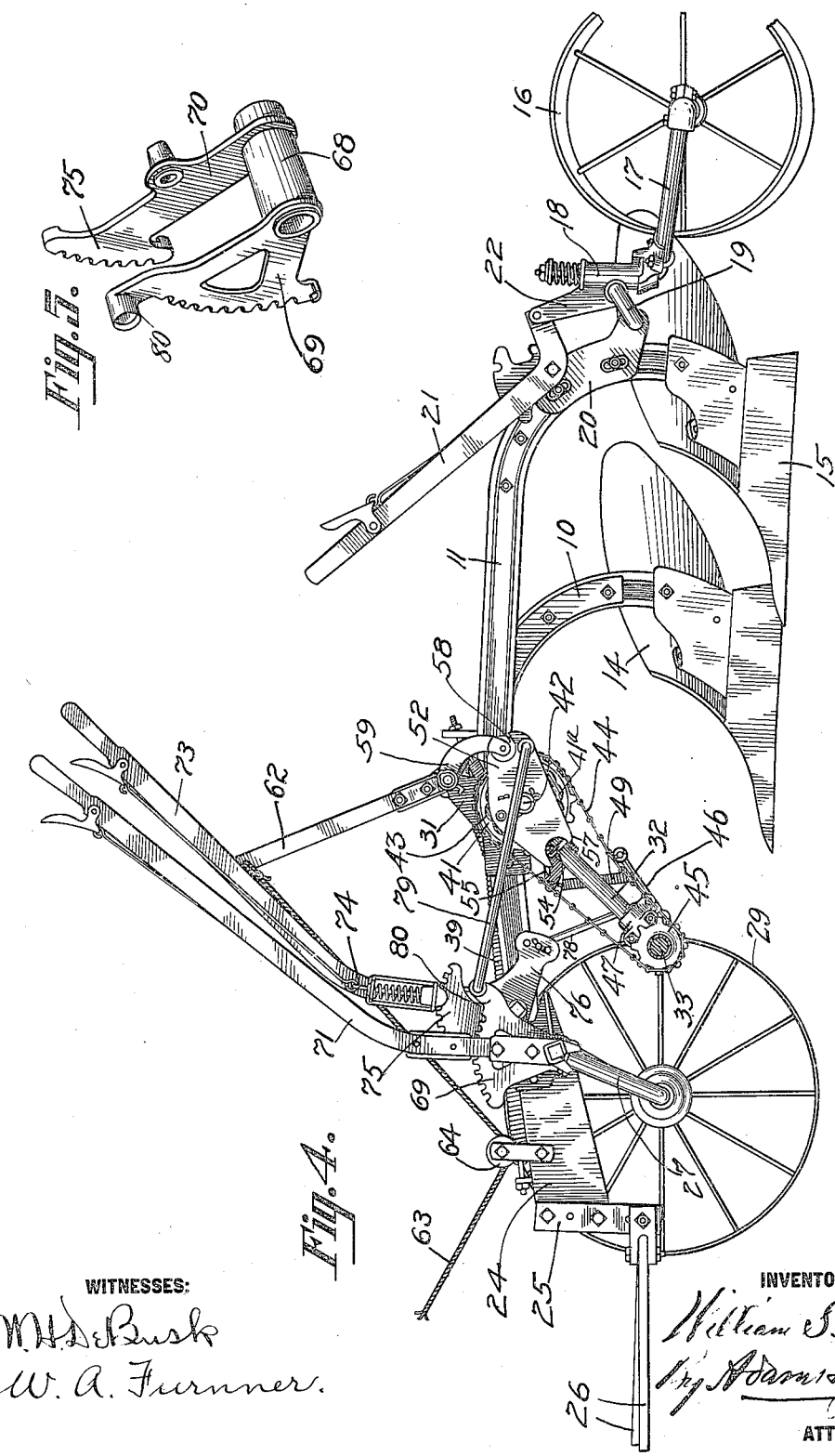

UNITED STATES PATENT OFFICE.

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

GANG-PLOW.

1,237,505.   Specification of Letters Patent.   Patented Aug. 21, 1917.

Application filed January 22, 1915. Serial No. 3,792.

*To all whom it may concern:*

Be it known that I, WILLIAM S. GRAHAM, a citizen of the United States, and a resident of Canton, in the county of Fulton and State of Illinois, have invented certain new and useful Improvements in Gang-Plows, of which the following is a specification, reference being had to the accompanying drawings.

This invention relates to gang-plows, and especially to that "frameless" type of gang-plow adapted to be drawn by a traction engine comprising two or more plow-beams rigidly tied together for forming the plow frame, the plow bodies being adapted to be moved into and out of operative plowing position by swinging the supporting wheels up or down relative to the plow-beams. It is one of the objects of my invention to utilize, in a plow of this type, the traction power of one of the supporting wheels for moving said wheels up and down relative to the beams for controlling the position of the plow bodies, suitable connections being provided between the supporting wheel from which power is taken and the mechanism employed for raising the plow-bodies whereby the bodies are raised gradually, as desired, from operative position. It is another object of my invention to so arrange the mechanism of a plow of the type just referred to that the raising of the rigidly-tied plow-beams may be timed in such a manner that the successive bodies of the series may be caused to run out of the ground successively so as to leave an approximately even furrow. It is another object of my invention to provide in a plow of this type such an arrangement that the levers by which the depth of the plowing is regulated may be caused to project forward within convenient reach of the operator while the plow-bodies are in operative position and to extend backward out of the way so as not to interfere with the tractor when turning with the bodies out of the ground. It is another object of my invention to provide in a plow of this type power means both for raising the plows out of the ground and for forcing the plows again into the ground, suitable yielding means being employed for assisting in lifting the plows out of operative position, thus reducing the traction power necessarily attained by the supporting wheel from which power is taken and making possible the use of a traction wheel with a smooth tread without danger of undue slippage of the said wheel. It is another object of my invention to provide a construction of plow of this type in which the supporting wheel from which power is taken is geared down relative to the coöperating plow-raising mechanism whereby the effective traction force of said supporting wheel may be increased as desired and making possible the elimination of cleats or other projections beyond the normal face of the supporting wheel, thus removing the danger of objectionable jar and vibration in the running of the plow. It is another object of my invention to improve gang-plows in sundry details hereinafter pointed out. The preferred means by which I have accomplished my several objects are illustrated in the accompanying drawings and are hereinafter specifically described. That which I believe to be new and desire to cover by this application is set forth in the claims.

In the drawings,—

Figure 1 is a top or plan view of a plow embodying my improved construction;

Fig. 2 is a side view of my improved plow, with the land wheel omitted therefrom for the sake of clearness of illustration;

Fig. 3 is an enlarged detail of certain of the plow-raising elements, being substantially a section taken on line 3—3 of Fig. 1;

Fig. 4 is a side view similar to Fig. 2, but showing the plow-bodies in raised position;

Fig. 5 is an enlarged detail, being a perspective view of the integral sleeve and segmental rack construction employed in connection with the plow-raising mechanism.

Referring to the several figures of the drawings, in which corresponding parts are indicated by the same reference characters,—10—11 indicate plow-beams arranged side by side, tied together at their forward ends by a transverse brace 12 and tied together near their rear ends by a diagonally-disposed brace 13. Plow-bodies 14—15 are mounted in any suitable manner upon the rear ends of the beams 10—11, respectively, in suitable coöperative position. 16 indicates a rear furrow-wheel mounted by means of an axle-member 17, a sleeve 18, a swinging link 19, and a bracket 20 upon the plow-beam 11 behind the plow-bottom 15. A lever 21 is pivotally mounted upon the bracket 20, the lower turned end of which is pivotally connected with an arm 22 fixed upon the sleeve 18. As will be appreciated by reference to Figs. 2 and 4, by a rearward movement of the lever 21 out of the position shown in said figures, the wheel 16 would be depressed relative to the plow-beam 11, serving to lift the plow-beams relative to said wheel for purposes of transportation of the plow. Inasmuch as the lifting mechanism just described forms no part in and of itself of my present invention, it is not believed to be necessary to describe it further herein.

At their forward ends the plow-beams 10—11 have fixedly connected to them in any suitable manner extension-plates 23—24, respectively, to the forward ends of which are secured vertical hitch-straps 25 from which draft-bars 26 of any suitable type extend forward for connection to a tractor.

Revolubly mounted in suitable bearings in the rear ends of the extension-plates 23—24 is an axle-member 27, upon an offset laterally-extending portion 28 of which is suitably journaled a supporting wheel 29. Revolubly mounted in suitable brackets 30—31 carried by the beams 10—11 in rear of the axle 27 is another axle 32 upon an offset laterally-extending portion 33 of which is journaled a supporting wheel 34. As will be readily understood from an inspection of Figs. 2 and 4, when the shaft 27 is rocked in clockwise direction in Fig. 2 and the shaft 32 is rocked in counterclockwise direction in said Fig. 2, the plow-beams 10—11 are raised relative to the supporting wheels 29 and 34, causing the plow-bodies 14—15 to run out of operative engagement with the ground. Fixed upon the shaft 27 and rising therefrom is an arm 35 connected by means of a coiled spring 36 with an arm 37 mounted upon the plow-beam 11 rearwardly of the arm 35, said spring serving to assist in the turning of the shaft 27 in clockwise direction in Fig. 2 for raising the plow-bodies. Fixed upon the shaft 32 and rising therefrom is an arm 38 connected by means of a coiled spring 39 with an arm 40 mounted upon the transverse bar 12, such spring 39 serving to assist in the rocking of the shaft 32 in counterclockwise direction in Fig. 2 for effecting a raising of the plow-bodies 14—15.

The means for turning the shafts 27 and 32 for effecting the raising and lowering of the plows out of and into operative engagement with the ground comprises a drum-like clutch-member 41 rotatably mounted by means of a web 41ª upon a pin 42 extending laterally from the bracket 31, said clutch-member being provided with sprocket-teeth upon its outer periphery and being provided with a series of rounded notches or grooves 43 about its inner periphery. The clutch-member 41 is adapted to be continuously driven in counterclockwise direction in Figs. 2 and 4 by means of a sprocket-chain 44 meshing with the teeth upon said clutch-member and operating upon a gear 45 which is fixed in any suitable manner upon the hub of the land-wheel 34, or is otherwise suitably connected to said hub so as to rotate therewith. Inasmuch as the clutch-member 41, which is connected by the chain 44 with the gear 45 mounted upon the spindle portion 33 of the axle 32, is not mounted upon the axis of rotation of the shaft 32 as it is rocked for raising and lowering the plow-bodies, I have provided yielding means for taking up the slack of the chain 44. Such yielding means comprises an arm 46 pivotally mounted upon a corner-block 47 suitably secured upon the axle-member 32, said arm being provided at its free end with a laterally-extending roller 48 revolubly mounted thereon in position to engage the lower face of the chain 44. A spring 49 is connected to the arm 46 and to an arm 50 projecting from another corner-block 51 fixed upon said axle-member 32, said spring 49 serving to hold the arm 46 in a position to take up the slack in the chain, as will be readily understood.

Revolubly mounted upon the pin 42 adjacent to the clutch-member 41 is a plate 52 provided at its ends with rounded openings 53—54, as best shown in Figs 2 and 4. Pivotally mounted upon the plate 52 is a spring-seated dog 55 adapted to engage any one of the grooves or notches 43 of the clutch-member 41. The arrangement is such that when the clutch-member 41 is driven in counterclockwise direction in Figs. 2 and 4 with the dog 55 in engagement with one of the rounded notches 43 of the clutch-member, the plate 52 will be rotated in the same direction therewith. Inasmuch as the clutch here employed is of the type shown and described in Letters Patent No. 1,163,143, granted to me on December 7, 1915, it is believed to be unnecessary to describe in detail its construction, since it forms in and of itself no part of my present invention. As is usual in clutches of this type, means are provided for holding the dog 55 out of engagement with the clutch-member 41 as desired, such means comprising a roller 58 adapted to engage either one of the rounded openings 53 and 54 of the plate 52, the roller when in such engaging position serving to hold the dog 55 turned out of operative engaging position. This roller 58 is revolubly mounted upon one end of a lever 59 fixed upon a sleeve 60 revolubly mounted upon a pin 61 fixed upon and extending laterally from the upper end of the bracket 31. Fixed upon said sleeve 60 and extending upwardly therefrom is a lever 62 (see Fig. 2) having connected to its upper end a cord or cable 63 extending under a suitable pulley 64 revolubly mounted upon the extension-plate 24, said cord 63 being adapted to extend forward to the tractor into convenient reach of the operator. An arm 65 (see Fig. 3) is also mounted upon the sleeve 60 and extends diagonally downward therefrom, having connected to its lower end one end of a coiled spring 66, the other end of which is adjustably connected in any suitable manner to a stationary part of the framework, being secured in the construction shown to the bracket 31. The spring 66 serves to hold the lever 62 and the lever 59 turned yieldingly to the limit of their movement in clockwise direction in Figs. 2 and 4, in position normally to engage the dog 55 and to hold it out of operative engagement with the notches 43 of the clutch-member 41.

As will be readily understood, with the roller 58 in engagement with one of the openings or sockets 53—54 of the plate 52, in which position said roller serves to hold the dog 55 out of operative engagement with the clutch-member 41, a forward pull upon the cord 63 by the operator will serve to swing the levers 62 and 59 in counterclockwise direction in Figs. 2 and 4 against the action of the spring 66, withdrawing the roller 58 from its engagement with the socket 53 or 54 and permitting the dog 55 to move into operative engagement with the clutch-member 41. As will be readily understood by those familiar with this type of clutch, when the plate 52 has made substantially a half rotation with the clutch-member 41, the roller 58, which will have been returned by the spring 66 to its normal position relative to the pin 42, will be engaged by one of the cam portions 67 of the plate 52, causing the roller 58 to move outward upon the cam face. Upon the continued rotation of the plate 52, the roller 58 is brought into contact with one end of the dog 55, whereupon a slight additional rotative movement of the plate 52 serves to throw the said dog 55 out of operative engagement with the clutch-member 41, thus stopping the rotation of the plate 52. As is readily understood, the plate 52 may be given as many half rotations as may be desired by successive actuations of the lever 62 at proper intervals by means of the cord 63, or in any other suitable manner.

I will now describe the connections between the plate 52 and the shafts 27 and 32 whereby such shafts may be rocked through the medium of the said plate. 68 indicates a sleeve revolubly mounted upon the shaft 27, having formed integrally with it a segmental-rack 69 at one of its ends and an arm 70 extending from its other end. 71 indicates a lever fixed upon the squared end of the shaft 27 adjacent to the segmental-rack 69, said lever being adapted to be locked by a spring-latch 72 of any suitable type in any desired position upon said rack. A lever 73 is pivotally mounted upon the arm 70 at some little distance above the sleeve 68, being adapted to be held by a spring-latch 74 of any suitable type in any suitable position relative to a segmental-rack 75 carried by the arm 70 in concentric position about the pivotal point of said lever 73 upon the arm 70. The lever 73 has extending rearwardly from its lower end an arm 76 provided with a plurality of openings 77 in its rear end for the reception of the turned end of a link 78, the other turned end of which is pivotally secured in a suitable opening in the corner-block 47 mounted upon the axle-member 32, the shafts 32 and 27 being thus adjustably connected together. A link 79 is pivotally connected at its rear end to the plate 52 and at its forward end is pivotally connected to an arm 80 carried by the segmental rack 69.

As will be readily understood, when the plate 52 is given a half rotation in counterclockwise direction from the position shown in Fig. 2, the segmental-rack 69 will be swung backward, causing, through the medium of the lever 71, a rocking of the shaft 27 in clockwise direction in said figure, causing the furrow-wheel 29 to be moved forward relative to the plow-beams and raising the plow-beams into the position shown in Fig. 4; the spring 36 serving to assist in such operation. At the same time the rack-bar 75, the lever 73 latched thereto, and the arm 76 carried by the lever 73, will be swung in clockwise direction in Fig. 2, serving, through the medium of the link 78, to swing the laterally-extending spindle portion 33 of the axle-member 32 downward and backward, bringing the spindle portion 33 to substantially the same height as that then assumed by the spindle portion 28 of the axle 27, the spring 39 serving to assist in this operation. Upon the next-succeeding half rotation of the plate 52 in counterclockwise direction from the position shown in Fig. 4, the axle-members 27 and 32 will be swung in the reverse direction from that just described, serving to swing the supporting wheels upward relative to the plow-beams against the action of the springs 36 and 39, thus causing the plow bodies to enter the ground. Inasmuch as the sprocket-gear 45 is of considerably smaller diameter than that of the sprocket-gear formed on the outer face of the clutch-member 41, the rocking of the axles 27 and 32 will be quite slow, the requisite power for raising the plows being thus attained without the necessity for providing the periphery of the wheel 34 with cleats or other extensions for the purpose of obtaining a better grip upon the ground. In the construction shown, the gear 45 is of just half the diameter of the sprocket-gear formed on the clutch-member 41, but it will be understood that in practice the relative sizes of these sprocket-gears may be regulated as desired. As will be readily understood, the height at which the wheel 29 will stand relative to the plow-beams 10—11, both when the plow is in operative position and when the plow-bodies are held in raised position, may be regulated by an adjustment of the lever 71 relative to the segmental-rack 69. In the same manner, the height at which the wheel 34 will stand relative to the plow-beams 10—11 can be regulated by an adjustment of the lever 73 relative to the segmental-rack 75. By an adjustment of the turned end of the link 78 from one to another of the openings 77 in the end of the arm 76, the relative positions of the wheels 34 and 29 can be adjusted independently of the levers 71—73. As will be appreciated, the adjustment of the lever 73 for increasing the depth of plowing,—that is to say, for adjusting the wheel 34 to a higher position relative to the plow-beams 10—11,—is accomplished by a forward movement of the said lever 73. By reason of the lever 73 being pivoted upon the arm 70 above the sleeve 68, a forward adjustment of the lever 73 serves to increase the distance between the end of the arm 76 and the sleeve 68, thus increasing the length of the throw of the arm 76 and correspondingly increasing the length of movement of the link 78. That is to say, as the depth of plowing is increased by a forward movement of the lever 73, the extent of the arc through which the shaft 32 is swung is correspondingly increased. By this means the rate at which the plow-beams are withdrawn from the ground is increased as the depth of plowing is increased, as a result of which the mechanism serves to raise the plow out of contact with the ground regardless of the depth at which the plow was working. By reason of this construction the operation of raising the plow-beams when the plows are running deep in the ground is distributed throughout substantially the entire half rotation of the plate 52. As the depth of plowing is decreased, upon the actuation of the mechanism for raising the plows from the decreased depth, the operation still occupies substantially the full time taken for the half rotation of the plate 52.

By reason of the gradual raising of the plow-bodies 14—15 during the continued forward movement of the plow, I am enabled to cause the series of plows to leave the ground at substantially a line at right angles to the direction of plowing, this being regulated, in part, by the adjustment of the axles 27—32 relative to each other, and by a proper adjustment of the relative sizes of the sprocket-gears upon which the chain 44 operates. Upon the lowering of the plow-bodies, they are lowered also in succession so as to engage the ground successively at substantially a line at right angles to the direction of plowing.

By reason of my arrangement of parts, the levers 71—73 by which the depth of plowing is regulated extend forward while the plow is in operation into convenient reach of the operator upon the tractor. When the plow-bodies have been raised as above described for turning at the end of a furrow, the levers 71—73 extend toward the rear, as shown in Fig. 4, so as not to interfere with the tractor in the turning operation. So far as I am aware, I am the first in the art to attain this end, and my claims are to be construed accordingly.

In referring to a frame in the specification and claims upon which the plow-bodies are mounted, the vertically-adjustable frame is meant as distinguished from a separate vehicle frame upon which plow-beams carrying plow-bodies are pivotally mounted as is common and well-known construction.

That which I claim as my invention, and desire to secure by Letters Patent, is,—

1. In a gang-plow, the combination of a rigid frame, a plurality of plow-bodies fixedly mounted on said frame, and means for raising the forward end of said frame for causing the plow-bodies to leave the ground substantially on a line at right angles to the line of plowing, said frame-raising means comprising supporting wheels mounted on said frame and movable vertically relative thereto, mechanically-operated power mechanism, connections between said power mechanism and said wheels, and means adapted to be actuated when the plow reaches the end of a previous furrow for throwing said power mechanism into operation to move said supporting wheels in proper timed relation to each other downwardly relative to said frame and each in proper timed relation to the forward movement of said frame whereby when one of said wheels rises out of the end of the furrow in which it travels said wheels with their coöperating parts serve to move the forward end of the frame upward gradually relative to the rear end for bringing the plow-bodies out of the ground substantially on a line at right angles to the line of plowing.

2. In a gang plow, the combination of a rigid frame, a diagonally-disposed series of plow-bodies fixedly mounted on said frame, crank-axles mounted on said frame, supporting wheels revolubly mounted on offset portions of said crank-axles respectively, and means for swinging said axles in opposite directions,—comprising a rotary member operatively connected with said axles and adapted by a partial rotation to turn said axles for raising the wheels relative to the frame and adapted by the remainder of a complete rotation to turn said axles for lowering the wheels relative to the frame, and connections between one of said wheels and said rotary member adapted to drive said rotary member at a slower speed of rotation than that of the said supporting wheel in proper timed relation to move the supporting wheels vertically at a proper rate relative to the forward movement of the frame whereby said supporting wheels with their coöperating frame-moving parts serve to cause the plow-bodies to enter the ground, and in turn to leave the ground, substantially on a line at right angles to the line of plowing.

3. In a gang-plow, the combination of a plow-body, a ground-wheel, adjustable connections between said plow-body and said ground-wheel,—comprising an adjusting lever operatively connected with said ground-wheel and said plow-body for changing the position of the ground-wheel relative to the plow-body for regulating the depth of plowing,—and other means adapted to act independently of the adjustment of said lever for moving said ground-wheel vertically relative to said plow-body for lowering the plow-body into operative position or for raising it out of operative engagement with the ground, said lever being adapted by reason of its operative connection with the ground-wheel to be swung by the operation of said last-named wheel-moving means, the arrangement being such that said lever is swung forward into convenient position for operation at the forward end of the plow upon the downward movement of the plow-body into operative engagement with the ground and is swung backward out of the way of the operator and out of the way of the traction means upon the upward movement of the plow-body out of operative engagement with the ground.

4. In a gang-plow, the combination of a frame, a plow-body mounted on said frame, a ground-wheel movable vertically relative to said frame, means for moving said ground-wheel vertically relative to the frame for lowering the plow-body into operative engagement with the ground or for raising the plow-body out of operative engagement with the ground, a lever operatively connected with said ground-wheel and adapted through the medium of said connection to be swung longitudinally of the frame upon the raising and lowering movements of the plow-body, and means actuated by said lever for adjusting the vertical position of the ground-wheel relative to the frame for regulating the depth of plowing, the arrangement being such that said lever by the lowering of the plow-body is swung forward into convenient position for the operator at the forward end of the frame and by the raising of the plow-body is swung backward out of the way of the operator.

5. In a gang-plow, the combination of a frame, a plow-body mounted on said frame, a transversely-extending axle-member journaled on said frame, a ground-wheel journaled upon an offset portion of said axle-member adapted to be raised relative to said frame by the backward rocking of said axle-member and adapted to be lowered relative to said frame by the forward rocking of said axle-member, a lever mounted on said axle-member, means for rocking said axle-member for moving the frame vertically relative to the ground-wheel for raising and lowering the plow-body, and means coöperating with said lever for adjusting the ground-wheel relative to said axle-rocking means for controlling the depth at which said plow-body shall run in the ground, said lever being adapted to be swung freely with the axle-member independently of the adjustment of the lever for controlling the depth of plowing, being adapted upon the operation of lowering the plow-body to swing forward into convenient position for adjustment at the forward end of the frame and being adapted upon the operation of raising the plow-body to swing backward out of the way of the operator.

6. The combination of a plow-beam, a plow-body fixed thereon, an axle-member adapted to swing forward and backward relative to said plow-beam, a ground-wheel journaled upon a horizontal axis upon said axle-member and adapted to be moved up and down relative to said plow-body by the swinging of said axle-member, a second axle-member adapted to swing up and down relative to said plow-beam, a ground-wheel journaled upon a horizontal axis upon said second axle-member, a pair of levers for adjusting the positions of said ground-wheels relative to said plow-beam for regulating the depth at which said plow-body shall work in the ground, both of said levers being adapted to extend forward when the plow-body is in operative engagement with the ground, and means serving to adjust both of said ground-wheels vertically relative to said plow-beam for raising said plow-body out of operative engagement with the ground and to simultaneously swing said levers backward relative to the plow-beam.

7. The combination of a plow-beam, a plow-body fixed thereon, an axle-member adapted to swing forward and backward relative to said plow-beam, a ground-wheel journaled upon a horizontal axis upon said axle-member adapted to be moved downward relative to said plow-body by the forward stroke of said axle-member and to be moved upward relative to said plow-body by the backward stroke of the axle-member, a lever mounted on said axle-member and adapted to be held in adjusted position relative to the plow-beam for adjusting the position of said ground-wheel relative to said plow-beam for regulating the depth at which said plow-body shall work in the ground, said lever being adapted to extend forward when the plow-body is in operative engagement with the ground, and means connected with said lever for swinging said axle-member to raise said plow-body out of operative engagement with the ground and for simultaneously swinging said lever backward relative to the plow-beam.

8. The combination of a plow-beam, a plow-body fixed thereon, an axle-member adapted to swing up and down relative to said plow-beam, a ground-wheel journaled upon a horizontal axis upon said axle-member, a lever mounted on said axle-member and adapted to be held in adjusted position relative to the plow-beam for adjusting the position of said ground-wheel relative to said plow-beam for regulating the depth at which said plow-body shall work in the ground, and means adapted to act upon said lever for swinging said axle-member to raise said plow-body.

9. The combination of a plow-beam, a plow-body fixed thereon, an axle-member adapted to swing up and down relative to said plow-beam, a ground-wheel journaled upon a horizontal axis upon said axle-member, a lever mounted on said axle-member and adapted to be held in adjusted position relative to the plow-beam for adjusting the position of said ground-wheel relative to said plow-beam for regulating the depth at which said plow-body shall work in the ground, and power-actuated means acting upon said lever adapted to be given a single half revolution at each actuation for swinging said axle-member to raise said plow-body.

10. The combination of a plow-beam, a plow-body fixed thereon, an axle-member adapted to swing up and down relative to said plow-beam, a ground-wheel journaled upon a horizontal axis upon said axle-member, a lever mounted on said axle-member and adapted to be held in adjusted position relative to the plow-beam for adjusting the position of said ground-wheel relative to said plow-beam for regulating the depth at which said plow-body shall work in the ground, a rotatable plate, a gear adapted to be driven continuously during the forward movement of the plow, clutch mechanism adapted to connect said gear with said rotatable plate for giving it at each actuation a single half revolution, and connections between said plate and said lever whereby upon the rotation of said plate said lever and said axle-member are swung relative to said frame for moving said plow-body vertically.

11. The combination of a plow-beam, a plow-body fixed thereon, an axle-member adapted to swing up and down relative to said plow-beam, a ground-wheel journaled upon a horizontal axis upon said axle-member, a lever mounted on said axle-member and adapted to be held in adjusted position relative to the plow-beam for adjusting the position of said ground-wheel relative to said plow-beam for regulating the depth at which said plow-body shall work in the ground, a rotatable plate, a gear adapted to be driven continuously during the forward movement of the plow, clutch mechanism adapted to connect said gear with said rotatable plate for giving it at each actuation a single half revolution, and connections between said plate and said lever whereby upon the rotation of said plate said lever and said axle-member are swung relative to said frame for raising or lowering said plow-body relative to the ground, said lever being adapted to extend forward when the plow-body is in its lowered operative position.

12. The combination of a plow-beam, a plow-body fixed thereon, an axle-member adapted to swing up and down relative to said plow-beam, a ground-wheel journaled upon a horizontal axis upon said axle-member, a lever mounted on said axle-member and adapted to be held in adjusted position relative to the plow-beam for adjusting the position of said ground-wheel relative to said plow-beam for regulating the depth at which said plow-body shall work in the ground, a second axle-member adapted to swing up and down relative to said plow-beam, a ground-wheel journaled upon a horizontal axis upon said second axle-member, and means actuated by the rotation of said second-named ground-wheel for swinging said lever and said first-named axle-member to raise said plow-body.

13. The combination of a plow-beam, a plow-body fixed thereon, an axle-member adapted to swing up and down relative to said plow-beam, a ground-wheel journaled upon a horizontal axis upon said axle-member, a lever mounted on said axle-member and adapted to be held in adjusted position relative to the plow-beam for adjusting the position of said ground-wheel relative to said plow-beam for regulating the depth at which said plow-body shall work in the ground, a second axle-member adapted to swing up and down relative to said plow-beam, a ground-wheel journaled upon a horizontal axis upon said second axle-member, means actuated by the rotation of said second-named ground-wheel for swinging said lever and said first-named axle-member relative to said plow-beam, and co-operating means serving to simultaneously swing said second axle-member relative to said plow-beam.

14. In a gang plow, the combination of a rigid frame, a plurality of plow-bodies fixedly mounted on said frame, two crank-axles mounted on said frame, the crank-arm of each of which axles is adapted to swing toward the other axle, a furrow-wheel journaled upon the rearwardly-extending crank-arm of one of said crank-axles, a land-wheel journaled upon the forwardly-extending crank-arm of the other axle, and means actuated by power from one of said wheels for simultaneously swinging said crank-arms in opposite directions in timed relation to the forward movement of the plow whereby said plow-bodies enter the ground substantially on a line at right angles to the line of plowing.

15. The combination of a plow-beam, a plow-body fixed thereon, two axle-members adapted to swing up and down relative to said plow-beam, ground-wheels journaled upon horizontal axes upon said axle-members respectively, a sleeve revolubly mounted on one of said axle-members, a lever fixed on said axle-member and adjustably connected with said sleeve, a second lever adjustably mounted relative to said sleeve, and connections between said second lever and the other of said axle-members whereby said axle-members are swung together for raising or lowering said plow-body.

16. The combination of a plow-beam, a plow-body fixed thereon, two axle-members adapted to swing up and down relative to said plow-beam, ground-wheels journaled upon horizontal axes upon said axle-members respectively, a revoluble member adapted to be rotated about a fixed pivot, means for rotating said revoluble member, a lever revolubly mounted relative to said revoluble member eccentrically of the axis about which said member is rotatable, and means operatively connecting said lever with one of said axle-members for swinging said axle-member for raising or lowering said plow-body.

17. The combination of a plow-beam, a plow-body fixed thereon, two axle-members adapted to swing up and down relative to said plow-beam, ground-wheels journaled upon horizontal axes upon said axle-members respectively, a sleeve revolubly mounted on one of said axle-members, a lever fixed on said axle-member and adjustably connected with said sleeve, a second lever adjustably mounted on said sleeve eccentrically of the axis of rotation of said sleeve, and connections between said second lever and the other of said axle-members whereby said axle-members are swung together for raising or lowering said plow-body and whereby an adjustment of said second lever for increasing the depth of plowing serves to correspondingly increase the effective throw of said second lever relative to the axle-member swung thereby.

18. The combination of a plow-beam, a plow-body fixed thereon, two axle-members adapted to swing up and down relative to said plow-beam, ground-wheels journaled upon horizontal axes upon said axle-members respectively, a sleeve revolubly mounted on one of said axle-members, a lever fixed on said axle-member and adjustably connected with said sleeve, a bell-crank lever adjustably mounted on said sleeve eccentrically of the axis of rotation of said sleeve, and connections between said bell-crank lever and the other of said axle-members whereby said axle-members are swung together for raising or lowering said plow-body and whereby an adjustment of said bell-crank lever for increasing the depth of plowing serves to correspondingly increase the effective throw of said bell-crank lever relative to the axle-member swung thereby.

19. In a gang plow, the combination of a frame, a plurality of plow-bodies fixedly mounted on said frame, two crank-axles mounted on said frame, supporting wheels journaled on offset portions of said crank-axles respectively, means for rocking one of said crank-axles for raising and lowering the supporting wheel mounted thereon, and connections between said two crank-axles whereby the rocking of one axle in one direction causes the other to rock in the opposite direction, comprising an arm carried by one of said axles and adapted to revolve about said axle as an axis, a link pivotally connecting said arm with the other axle, and means for adjusting said arm relative to the axle by which it is carried whereby the effective length of the arm relative to the axis about which it revolves may be materially changed.

20. In a gang plow, the combination of a frame, a plurality of plow-bodies fixedly mounted on said frame, two crank-axles mounted on said frame, supporting wheels journaled on offset portions of said crank-axles respectively, means for rocking one of said crank-axles for raising and lowering the supporting wheel mounted thereon, and connections between said two crank-axles whereby the rocking of one axle causes the other axle also to rock, comprising a bell-crank lever fulcrumed on one of said axles eccentrically of the axis of said axle, a link pivotally connecting one arm of said bell-crank lever with the other axle, and means adjustably securing the other arm of said bell-crank lever relative to the axle upon which it is fulcrumed.

21. In a gang plow, the combination of a frame, a plurality of plow-bodies fixedly mounted on said frame, two crank-axles mounted on said frame, supporting wheels journaled on offset portions of said crank-axles respectively, means for rocking one of said crank-axles for raising and lowering the supporting wheel mounted thereon, and connections between said two crank-axles whereby the rocking of one of said axles causes the other axle also to rock, comprising an arm revolubly mounted upon one of said axles eccentrically of the axis of said axle and extending toward the other axle when the supporting wheels are held in lowered position relative to the frame, a link pivotally connecting said arm with the other axle and extending substantially in the same direction as said arm when the supporting wheels are in their lowered position, and adjusting means for swinging said arm relative to the axle upon which it is mounted for varying the distance between the outer end of said arm and the axis of the axle without materially changing the position of the other axle relative thereto.

22. In a gang plow, the combination of a frame, a plurality of plow-bodies fixedly mounted on said frame, two crank-axles mounted on said frame, supporting wheels journaled on offset portions of said crank-axles respectively, means for rocking one of said crank-axles for raising and lowering the supporting wheel mounted thereon, and connections between said two crank-axles whereby the rocking of one of said axles causes the other axle also to rock, comprising a bell-crank lever fulcrumed on one of said axle eccentrically of the axis of said axle and having one of its arms extending toward the other axle when the supporting wheels are in lowered position relative to the frame, a link pivotally connecting said arm with the other axle and extending substantially in the same direction as said arm when the supporting wheels are in their lowered position, and adjusting means for swinging said bell-crank lever relative to the axle upon which it is mounted for varying the distance between the axis of the axle and the outer end of the arm of which said link is pivotally connected whereby the stroke of the one axle is varied relative to that of the other without any material change in the relative position of the axles when the wheels are in lowered position.

23. In a gang-plow, the combination of a rigid frame, a plurality of plow-bodies fixedly mounted on said frame, and means for moving the forward end of the frame downward for causing the plow-bodies to enter the ground substantially on a line at right angles to the line of plowing, comprising supporting wheels mounted on said frame and adjustable vertically relative thereto, and means operatively connected with one of said supporting wheels and positively driven thereby adapted to be thrown into operation when the plow approaches the end of a previous furrow for forcing said wheels upward relative to said frame in proper timed relation to the forward movement of the frame and in proper timed relation to each other whereby when one of said wheels descends into said furrow said wheel-moving means and the coöperating frame-controlling parts serve to move the forward end of the frame downward gradually relative to the rear end for causing the plow-bodies to enter the ground substantially on a line at right angles to the line of plowing.

24. In a gang plow, the combination of a rigid frame, a diagonally-disposed series of plow-bodies fixedly mounted on said frame, supporting wheels adjustably mounted on said frame near the forward end, means positively driven by the rotation of one of said supporting wheels adapted to force said supporting wheels upward gradually relative to said frame, comprising a clutch adapted to act positively for forcing the supporting wheels upward but adapted to yield for permitting the supporting wheels to move upward independently of positive action by the clutch, and yielding means adapted normally to prevent upward movement of the supporting wheels relative to the frame except as the wheels are forced upward by the action of the clutch.

25. In a gang plow, the combination of a rigid frame, a diagonally-disposed series of plow-bodies fixedly mounted on said frame, supporting wheels adjustably mounted on said frame near the forward end, means comprising a clutch adapted to act positively for forcing the supporting wheels upward relative to the frame independently of the weight of the frame but adapted to yield for permitting the supporting wheels to move upward independently of positive action, yielding means adapted normally to prevent the weight upon the frame from forcing the supporting wheels upward relative to the frame, and means positively driven by the rotation of one of said supporting wheels adapted to drive said clutch for forcing said supporting wheels upward relative to the frame.

26. In a gang plow, the combination of a rigid frame, a diagonally-disposed series of plow-bodies fixedly mounted on said frame, supporting wheels adjustably mounted on said frame near the forward end, means comprising a clutch adapted to act positively for forcing the supporting wheels upward relative to the frame independently of the weight of the frame but adapted to yield for permitting the supporting wheels to move upward independently of positive action, yielding means adapted normally to prevent the weight upon the frame from forcing the supporting wheels upward relative to the frame, and means for moving the forward end of the frame gradually downward for causing the plow-bodies to enter the ground substantially on a line at right angles to the line of plowing, comprising means operatively connected with said clutch and with one of said supporting wheels and positively driven by the rotation of said wheel for driving the clutch in proper timed relation to the forward movement of the frame whereby the supporting wheels are moved upward gradually relatively to the frame in proper timed relation for permitting the plow-bodies to enter the ground substantially on a line at right angles to the line of plowing.

27. In a gang-plow, the combination of a frame, a supporting wheel mounted on said frame and adjustable vertically relative thereto, and adjustable means operatively connecting said supporting wheel with said frame for controlling the position of the wheel relative to the frame,—comprising a rotary clutch, operative connections between said wheel and one member of said clutch adapted to drive said member constantly by power from said wheel at a slower speed of rotation than that of the wheel, a link pivotally connected with the other member of said clutch eccentrically of the axis about which the clutch revolves, and means for operatively connecting said link and said clutch in series one to the wheel and the other to the frame whereby upon a partial rotation of the clutch member to which said link is pivotally connected said wheel is moved downward relative to the frame and upon the remainder of a complete rotation of said clutch member said wheel is moved positively upward relative to the frame.

28. In a gang-plow, the combination of a frame, a supporting wheel mounted on said frame and adjustable vertically relative thereto, and adjustable means operatively connecting said supporting wheel with said frame for controlling the position of the wheel relative to the frame,—comprising a clutch revolubly mounted in fixed position upon said frame, operative connections between said wheel and one member of said clutch adapted to drive said member constantly by power from said wheel at a slower speed of rotation than that of the wheel, a link pivotally connected with the other member of said clutch eccentrically of the axis about which the clutch revolves, a swingingly-mounted arm pivotally connected with said link, and connections between said arm and said wheel adapted to cause the wheel to move vertically relative to the frame upon the swinging of the arm, whereby upon a partial rotation of the clutch member to which said link is pivotally connected said wheel is moved downward relative to the frame and upon the remainder of a complete rotation of said clutch member said wheel is moved positively upward relative to the frame.

29. In a gang plow, the combination of a frame, a supporting wheel mounted on said frame and adjustable vertically relative thereto, resilient means interposed between said supporting wheel and said frame and tending to move said wheel downward relative to the frame for holding the frame yieldingly in elevated position relative to the wheel adapted substantially to support the weight of the frame and the parts carried thereby, and adjustable means operatively connecting said supporting wheel with said frame for controlling the position of the wheel relative to the frame,—comprising a rotary clutch, operative connections between said wheel and one member of said clutch adapted to rotate said clutch-member constantly about its axis by power from said supporting wheel at a slower speed of rotation than that of the wheel, a link pivotally connected with the other member of said clutch eccentrically of the axis about which said clutch-member is rotated by power from said wheel, and means for operatively connecting said link and said clutch in series one to the wheel and the other to the frame whereby upon a partial rotation of the clutch-member to which said link is pivotally connected said wheel is moved downward relative to the frame and upon the remainder of a complete rotation of said clutch-member said wheel is moved positively upward relative to the frame against the action of said resilient means.

30. The combination of a plow-beam, a plow-body fixed thereon, an axle-member adapted to swing up and down relative to said plow-beam, a ground wheel journaled upon a horizontal axis upon said axle-member, a rotatable member, a gear, means actuated by the forward movement of the plow for driving said gear continuously during the said forward movement, clutch mechanism adapted to connect said gear with said rotatable member for giving said member at each actuation approximately a single half revolution, and means comprising a link pivotally connected with said plow-beam and pivotally connected with said rotatable member eccentrically relative to its axis of rotation actuated by successive half revolutions of the rotatable member adapted to swing said axle-member positively for giving said ground-wheel alternate up and down movements relative to said plow-beam.

31. The combination of a plow-beam, a plow-body fixed thereon, an axle-member adapted to swing up and down relative to said plow-beam, a ground-wheel journaled upon a horizontal axis upon said axle-member, a rotatable member, a sprocket gear, clutch mechanism adapted to connect said gear with said rotatable member for giving said member at each actuation approximately a single half revolution, a second sprocket gear connected with said ground-wheel and adapted to rotate therewith, a sprocket chain connecting said two sprocket gears for driving said first-named sprocket gear from said ground-wheel, means comprising a link pivotally connected with said plow-beam and pivotally connected with said rotatable member eccentrically relative to its axis of rotation actuated positively by successive half revolutions of the rotatable member adapted to swing said axle-member for giving said ground-wheel alternate up and down movements relative to said plow-beam, and means adapted to engage said rotatable member at each half revolution thereof when the link and rotatable member have moved relative to each other slightly past a dead-center position for holding said rotatable member against further rotation.

32. In a gang plow, the combination of a frame, a crank-axle mounted on said frame, a supporting wheel journaled on said crank axle, a second supporting wheel adjustably mounted on said frame, an arm mounted on said crank-axle, means actuated by a stroke of said arm in one direction for moving said second supporting wheel downward relative to said frame, a clutch one member of which is continuously driven by power from said second supporting wheel, and positively-acting means adapted to be actuated by an operative movement of the other member of the clutch for giving said arm a stroke in the direction for moving the second supporting wheel downward, the arrangement being such that upon the said stroke of the arm said crank-axle is turned for moving said first-named supporting wheel downward simultaneously with said second supporting wheel relative to the frame.

33. In a gang plow, the combination of a rigid frame, a plurality of plow-bodies fixedly mounted on said frame, a supporting wheel adjustably mounted on said frame, and means connected with said wheel and positively driven by the rotation thereof adapted to adjust said wheel vertically relative to the frame, comprising a rotatable member and a link pivotally connected together and connected in series between said frame and said wheel adapted to stand substantially in dead-center relations when the supporting wheel is held in either its uppermost or its lowermost position.

34. In a gang plow, the combination of a rigid frame, a plurality of plow-bodies fixedly mounted on said frame, a supporting wheel adjustably mounted on said frame, means connected with said wheel and positively driven by the rotation thereof adapted to adjust said wheel vertically relative to the frame, comprising a rotatable member and a link pivotally connected together and connected in series between said frame and said wheel adapted to stand substantially in dead-center relations when the supporting wheel is held in either its uppermost or its lowermost position, and means for holding said rotatable member against rotation out of its dead-center position relative to the link.

35. In a gang plow, the combination of a rigid frame, a plurality of plow-bodies fixedly mounted on said frame, a supporting wheel adjustably mounted on said frame, means connected with said wheel and positively driven by the rotation thereof adapted to adjust said wheel vertically relative to the frame, comprising a rotatable member and a link pivotally connected together and connected in series between said frame and said wheel adapted to stand substantially in dead-center relations when the supporting wheel is held in either its uppermost or its lowermost position, and means for throwing said wheel-adjusting means out of operation when said rotatable member and said link are moved relative to each other slightly beyond their dead-center positions.

36. In a gang plow, the combination of a rigid frame, a plurality of plow-bodies fixedly mounted on said frame, a supporting wheel adjustably mounted on said frame, means connected with said wheel and positively driven by the rotation thereof adapted to adjust said wheel vertically relative to the frame, comprising a rotatable member and a link pivotally connected together and connected in series between said frame and said wheel adapted to stand substantially in dead-center relations when the supporting wheel is held in either its uppermost or its lowermost position, means for throwing said wheel-adjusting means out of operation when said rotatable member and said link are moved relative to each other slightly beyond their dead-center positions, and means for holding said rotatable member against rotation from the position at which said wheel-adjusting means is thrown out of operation.

37. In a gang plow, the combination of a rigid frame, a plurality of plow-bodies fixedly mounted on said frame, a supporting wheel adjustably mounted on said frame, and means connected with said wheel and positively driven by the rotation thereof adapted to adjust said wheel vertically relative to the frame, comprising an arm operatively connected with the frame and adapted to swing relative to the frame, a rotatable member, and a link pivotally connecting said arm and said rotatable member, said rotatable member and said link being adapted to assume substantially dead-center relations to each other when the supporting wheel is held in either its uppermost or its lowermost position.

38. In a gang plow, the combination of a rigid frame, a plurality of plow-bodies fixedly mounted on said frame, a supporting wheel adjustably mounted on said frame, an arm swingingly mounted relative to said frame, means actuated by successive strokes of said arm in opposite directions for moving said wheel alternately up and down, a rotatable member adapted to be driven by power from said wheel, a link pivotally connecting said rotatable member and said arm, and means for automatically disconnecting said rotatable member from its driving means and for holding the member against rotation when said member and said link reach substantially dead-center positions relative to each other.

39. In a gang plow, the combination of a rigid frame, a plurality of plow-bodies fixedly mounted on said frame, a crank-axle mounted on said frame, supporting wheels mounted on said frame one of which supporting wheels is journaled on said crank-axle, an arm swingingly mounted relative to said frame, means positively actuated by power from one of said supporting wheels for swinging said arm, and means actuated by successive strokes of said arm in opposite directions for rocking said crank-axle for moving said wheel alternately up and down, comprising adjustable connections between said axle and said arm whereby the height to which said wheel shall be raised by power relative to the frame may be varied.

40. In a gang plow, the combination of a rigid frame, a plurality of plow-bodies fixedly mounted on said frame, a crank-axle mounted on said frame, supporting wheels mounted on said frame one of which supporting wheels is journaled on said crank-axle, an arm swingingly mounted on said crank-axle, means positively actuated by power from one of said supporting wheels for swinging said arm, a segmental rack operatively connected with said arm and adapted to move therewith, and a lever fixedly mounted on said crank-axle adapted to operatively engage said rack at any of a plurality of points.

41. In a gang plow, the combination of a rigid frame, a plurality of plow-bodies fixedly mounted on said frame, a crank-axle mounted on said frame, a supporting wheel journaled on said crank-axle, a second crank-axle mounted on said frame, a second supporting wheel journaled on said second crank-axle, an arm swingingly mounted upon said first-named crank-axle, means positively actuated by power from one of said supporting wheels for swinging said arm, a segmental rack operatively connected with said arm and adapted to move therewith, a lever fixedly mounted on said first-named crank-axle adapted to operatively engage said rack at any of a plurality of points, and operative connections between said arm and said crank-axle whereby said crank-axles are adapted to be swung simultaneously.

42. In a gang plow, the combination of a rigid frame, a plurality of plow-bodies fixedly mounted on said frame, a crank-axle mounted on said frame, a supporting wheel journaled on said crank-axle, a second crank-axle mounted on said frame, a second supporting wheel journaled on said second crank-axle, an arm swingingly mounted upon said first-named crank-axle, means positively actuated by power from one of said supporting wheels for swinging said arm, a segmental rack operatively connected with said arm and adapted to move therewith, a lever fixedly mounted on said first-named crank-axle adapted to operatively engage said rack at any of a plurality of points, and adjustable operative connections between said arm and said second crank-axle whereby said crank-axles are adapted to be swung simultaneously.

43. In a gang plow, the combination of a rigid frame, a plurality of plow-bodies fixedly mounted on said frame, a crank-axle mounted on said frame, a supporting wheel journaled on said crank-axle, a second crank-axle mounted on said frame, a second supporting wheel journaled on said second crank-axle, an arm swingingly mounted upon said first-named crank-axle, means positively actuated by power from one of said supporting wheels for swinging said arm, a segmental rack operatively connected with said arm and adapted to move therewith, a lever fixedly mounted on said first-named crank-axle adapted to operatively engage said rack at any of a plurality of points, a second segmental rack operatively connected with said arm, a second lever fulcrumed on said second rack eccentrically of the axis of said second rack and said arm relative to the frame and adapted to operatively engage said second rack at any of a plurality of points, and connections between said second lever and said second crank-axle whereby said crank-axles are adapted to be swung simultaneously.

44. In a gang plow, the combination of a rigid frame, a plurality of plow-bodies fixedly mounted on said frame, a crank-axle mounted on said frame, a supporting wheel journaled on said crank-axle, a second crank-axle mounted on said frame, a second supporting wheel journaled on said second crank-axle, an arm swingingly mounted upon said first-named crank-axle, means positively actuated by power from one of said supporting wheels for swinging said arm, a segmental rack operatively connected with said arm and adapted to move therewith, a lever fixedly mounted on said first-named crank-axle adapted to operatively engage said rack at any of a plurality of points, a second segmental rack operatively connected with said arm, a bell-crank lever fulcrumed on said second rack eccentrically of the axis of said second rack and said arm relative to the frame, one arm of said bell-crank lever being adapted to operatively engage said second rack at any of a plurality of points, and connections between the other arm of said bell-crank lever and said second crank-axle whereby said crank-axles are adapted to be swung simultaneously.

45. In a gang plow, the combination of a rigid frame, a plurality of plow-bodies fixedly mounted on said frame, a supporting wheel adjustably mounted on said frame, means for adjusting said wheel vertically relative to the frame, comprising a rotatable member and a link adapted to stand substantially in dead-center relations when the supporting wheel is held in either its uppermost or its lowermost position, and gearing interposed between said rotatable member and said supporting wheel adapted to drive said rotatable member by power from said wheel.

WILLIAM S. GRAHAM.

Witnesses:
C. J. EGGLESTON,
F. L. DEWEY.